US009227317B1

(12) United States Patent
Conley

(10) Patent No.: US 9,227,317 B1
(45) Date of Patent: Jan. 5, 2016

(54) TOOL TO MANIPULATE ITEMS WITHIN A TRUCK BED

(71) Applicant: John W. Conley, Surprise, AZ (US)

(72) Inventor: John W. Conley, Surprise, AZ (US)

( * ) Notice: Subject to any disclaimer, the term of this patent is extended or adjusted under 35 U.S.C. 154(b) by 0 days.

(21) Appl. No.: 14/687,903

(22) Filed: Apr. 15, 2015

(51) Int. Cl.
*B25J 1/04* (2006.01)

(52) U.S. Cl.
CPC .......................................... *B25J 1/04* (2013.01)

(58) Field of Classification Search
CPC ................................... B25J 1/04; A47F 13/06
USPC ......... 294/209–211, 22, 23, 24, 175; 172/375
See application file for complete search history.

(56) References Cited

U.S. PATENT DOCUMENTS 2,716,570 A * 8/1955 Beeman .......................... 294/22
2,785,483 A * 3/1957 Gajewski ........................ 37/284
4,624,494 A * 11/1986 Huppert .......................... 294/26
5,538,302 A * 7/1996 Travis ............................ 294/24
5,575,470 A * 11/1996 Sherman ....................... 473/489
D459,959 S * 7/2002 Fetterman et al. ............... D8/14
7,334,825 B1 * 2/2008 Sammon et al. ................ 294/24
7,490,880 B1 * 2/2009 Matsui .......................... 294/210
7,673,912 B2 * 3/2010 Breininger .................... 294/210
8,262,147 B2 * 9/2012 Boyum ......................... 294/209
8,641,110 B1 * 2/2014 Perry ............................. 294/24
8,915,529 B1 * 12/2014 Bond ............................ 294/209

* cited by examiner

*Primary Examiner* — Dean Kramer
(74) *Attorney, Agent, or Firm* — Iussa Law, PLLC

(57) ABSTRACT

This disclosure is directed towards a tool to manipulate items within a truck bed comprising an armature of suitable length coupled to a manipulating tool head. The head comprises; first and second planar plates suitably coupled together to comprise an elongated, substantially L-shaped configuration, and a receptacle integrated proximate to a center portion of the second planar plate. The receptacle is configured to receive an end of the armature. The head further comprises a hooking element extending from the rear edge of the second planar plate, substantially parallel to the first planar plate and normal to the second planar plate. The head also comprises reinforcement rib members integrated at a backside of the first and/or second planar plates. Various embodiments may comprise an armature having an ergonomic handle as well as telescopic elements, and the first and/or second planar plates may be textured.

17 Claims, 5 Drawing Sheets

TOOL TO MANIPULATE ITEMS WITHIN A TRUCK BED

FIELD OF THE INVENTION

The present disclosure generally relates to manipulation tools, more specifically, the present disclosure is directed towards a tool to manipulate items within a truck bed.

BACKGROUND OF THE INVENTION

Truck users and owners have long appreciated the benefits of such vehicles for their ability to transport various items within a truck bed. The truck bed provides a greater ability to transport numerous, bulky, heavy, and/or large volume items more so then enclosed compartment vehicles. In exchange for such benefit, a down side of truck beds is that manipulating items within the truck bed can be difficult and cumbersome. For example, items towards the cab end of a truck bed are often out of reach and a user must climb into the truck bed to retrieve or manipulate the item. Alternately, a user may attempt to move and lift items from along side of the truck bed, but this can be cumbersome and difficult as well, as the user must reach over the truck bed sidewall. Even in such instances where a user climbs into or reaches into the truck bed to manipulate items, the user often pulls on an edge or corner of an item creating a moment force that merely spins the item rather then moving the item as desired.

What is needed yet absent from the prior art is a tool to manipulate items within a truck bed that; effectively reaches from the tailgate end of a truck bed to a far end of a truck bed close to the truck cab; is structurally sound so as to manipulate items without bending or breaking the tool when manipulating heavy items; and minimizes creating moment forces when using the tool. In addition to the above, a tool that comprises an integrated hooking feature to hook items provides an even greater benefit for a user.

SUMMARY OF THE INVENTION

According to various embodiments, a tool to manipulate items within a truck bed (a truck bed tool) comprises an armature comprising a length to reach from a tailgate end of the truck bed to a cab end of the truck bed, and a manipulating tool head coupled to a distal end of the armature. The head comprises; an elongated, substantially planar front surface facing towards a proximate end of the armature, and wherein the front surface comprises a leading top edge and leading bottom edge. The head further comprises; a receptacle at a center portion and proximate to the leading top edge for receiving and affixing the armature to the head, and a hooking mechanism generally centered above the receptacle configured to selectively hook a truck bed item. The tool head may further comprise integrated reinforcement rib members within a rear cavity of the head, wherein the rear cavity is formed by a head perimeter extending rearward around edges of the front surface and the hooking mechanism. To facilitate manipulating items, the head may comprise the leading top edge to comprise a planar extension substantially normal to the front surface and extending towards the proximate end of the armature, wherein the front surface and planar extension are configured to conform to a straight edge of the truck bed item for easy manipulation as well as facilitate a distributed force along the edge of the item.

Among some embodiments, the truck bed tool may comprise an ergonomic hand grip affixed to the proximate end of the armature. The armature may comprise telescopic elements to provide for an adjustable armature length. Among some embodiments, the planar front surface and/or planar extension may be textured to deter slipping of the tool when engaged with an item. In still yet other embodiments, the armature and/or hooking mechanism may be releasable from the tool head.

Among other various embodiments, a truck bed tool comprises a first planar plate and a second planar plate suitably coupled together to comprise an elongated, substantially L-shaped configuration. It may also comprise a receptacle integrated proximate to or partially within a center portion of the second planar plate, and extending in a normal configuration from and along a front edge of the second planar plate towards a rear edge of the second planar plate; the receptacle is configured to receive an end of an extension tool. The tool may further comprise a hooking element extending from the rear edge of the second planar plate, substantially parallel to the first planar plate and normal to the second planar plate; as well as reinforcement rib members integrated on a backside of the first planar plate and a backside of the second planar plate. Among some of these embodiments, the truck bed tool may comprise the first planar plate to be tapered along a lower leading edge opposite an upper leading edge, wherein the upper leading edge comprises an intersection where the second planar plate joins the first planar plate.

Among all the various embodiments the receptacle may be threaded to couple to an extension tool or armature, and some or all of the various elements may be molded in a single piece. Finally, among all the various embodiments, a tool to manipulate items within a truck bed may comprise a method for manufacturing, packaging, marketing, distributing, and/or selling the truck bed manipulation tool.

BRIEF DESCRIPTION OF THE DRAWINGS

A more complete understanding of a tool to manipulate items within a truck bed (a truck bed tool) may be derived by referring to the detailed description of the invention and the claims when considered in connection with the following illustrative Figs. In the following Figs., like reference numbers refer to similar elements and/or steps throughout the Figs.

Elements and/or method steps in the Figs. are illustrated for simplicity and clarity and have not necessarily been rendered according to any particular construction or sequence. For example, method steps that may be performed concurrently or in different order are illustrated in the Figs. to help to improve an understanding of embodiments of the truck bed tool. Similarly, elements that disclose embodiments of various truck bed tool devices or systems may be assembled in various fashions are illustrated in the Figs. to similarly help improve the understanding of embodiments of the truck bed tool.

DETAILED DESCRIPTION OF THE INVENTION

A tool to manipulate items within a truck bed (a truck bed tool) may be described in terms of various functional elements and various method steps, and such functional elements may be realized by any number of hardware components configured to perform specified functions and achieve various results. For example, the truck bed tool may employ various handles, poles, tool heads, and hook elements; and configurations, such as, grips, poles, armatures, extension tools, head plates, receptacles, and the like to manipulate an item within a truck bed. The truck bed tool may be used in conjunction with any variety of products, e.g., boxes, planters, tools, rocks, dirt, as well any other product that may benefit from the truck bed tool. The truck bed tools described are merely exemplary applications for the truck bed tool. Further, any number of conventional techniques for manufacturing, packaging, marketing, distributing, and selling the disclosed truck bed tool may be employed.

Figure 1:
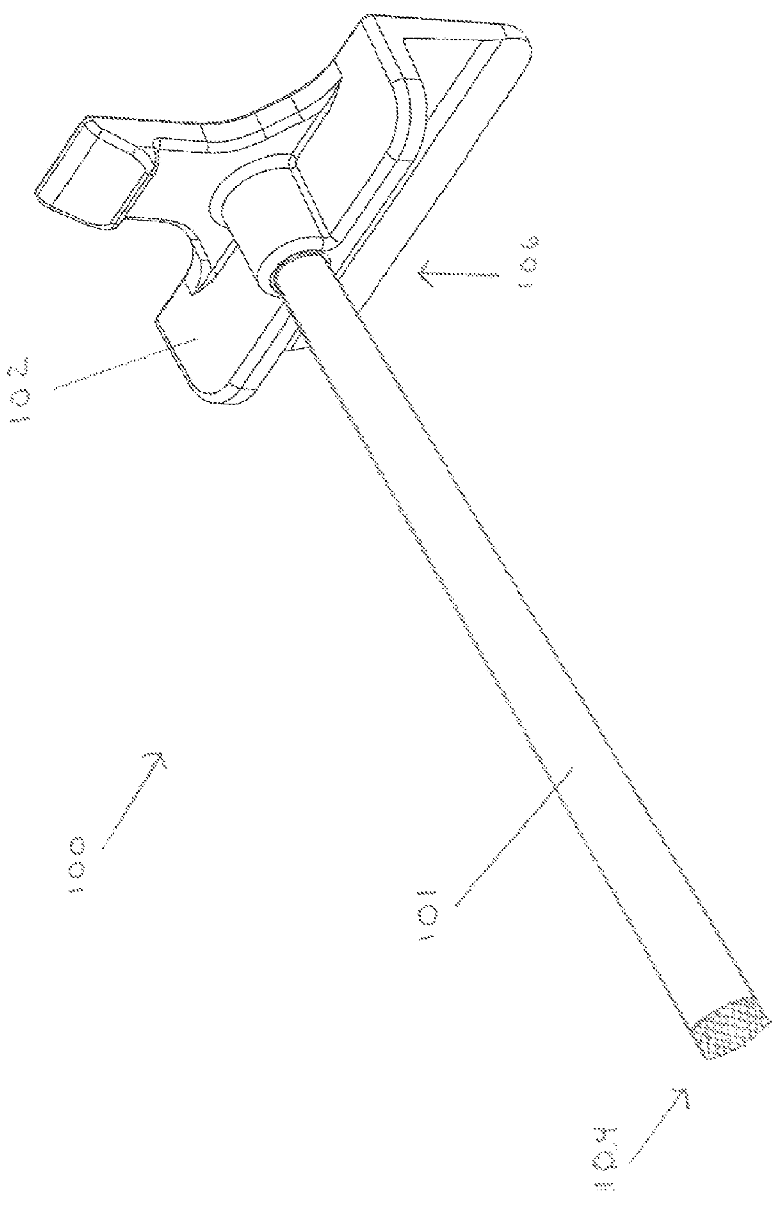
FIG. 1 representatively illustrates a perspective view of a truck bed tool.

Various embodiments of a truck bed tool may be applied to any manipulating tool system. Referring now to FIG. 1, a truck bed tool 100 may comprise an armature 101 that may suitably couple to a tool head 102. Among various embodiments, armature 101 comprises a proximate end 104 and a distal end 106. A user may manipulate tool 100 at proximate end 104 as well as at any point along armature 101. Tool head 102 may suitably couple at distal end 106 to armature 101. According to various embodiments, and with reference to FIG. 2, tool head 102 may comprise an elongated, substantially planar front surface or planar plate 210, wherein front surface 210 comprises a leading top edge 212 and a leading bottom edge 214. In this embodiment, leading top edge 212 comprises a planar extension or second planar plate 216 substantially normal to front surface 210. By this configuration, front surface 210 of tool 100, in conjunction with planar extension 216, is configured to conform to a straight edge of a truck bed item for easy manipulation and to facilitate a distributed force along the edge of the item. However, other items not having straight edges may be just as easily manipulated by tool 100.

Tool head 102 may further comprise a receptacle 218 at a center portion 220 and proximate to leading top edge 212 for receiving and affixing armature 101 to tool head 102. Tool head 102 may also comprise a hooking mechanism 222 above receptacle 218 and configured to selectively hook a truck bed item. Among various embodiments and with reference to FIG. 3, tool head 102 may comprise integrated reinforcement rib members 332 within a rear cavity 330, wherein rear cavity 330 may be formed by a head perimeter 334 extending rearward around edges of front surface 210 and hooking mechanism 222.

Among various embodiments, it is apparent to one skilled in the art that manipulation tool 100 may be operated by a user to manipulate items within a truck bed. For example, manipulating tool 100 may comprise using tool 100 to position items when loading the truck bed or to assist in removing items from the truck bed or arty type of rearrangement of items as needed. Moreover, one skilled in the art will appreciate that tool 100 is not limited to merely a truck bed environment, but tool 100 may be used in any environment that may benefit from a user needing an extension tool having the unique features disclosed herein to manipulate hard to reach items. For example, a user on a ladder may use tool 100 to manipulate items on a rooftop, or tool 100 may be used to reach and/or manipulate items deep in a storage closet, or tool 100 may be used to manipulate items on a shelf space, etc.

As disclosed, tool 100 comprises armature 101. Those skilled in the art will appreciate that armature 101 may comprise any type of extension tool, pole, stick, or any other type of element now known or developed in the future that can operate to provide a stable, suitable length by which tool head 102 may suitably couple and be operated by the user. For example, in a preferred embodiment armature 101 comprises a length at least as long to extend from a tailgate end of a truck bed to a cab end of the truck bed, and some armatures may be provided to accommodate truck beds of varying lengths, such as small pick-ups up to and including longer extended beds, Among various embodiments, armature 101 may comprise various materials, whether natural or synthetic, such as steel, aluminum, wood, titanium, plastic, and the like. Moreover, while armature 101 is shown as having a relatively straight configuration along its length, armature 101 may comprise any type of regular or irregular geometric configuration to facilitate use of tool head 102; armature 101 may be curved, tapered, cambered, textured, etc. It will further be appreciated by those skilled in the art that armature 101 may comprise other features to aid in using tool head 102. For example, armature 101 may comprise an ergonomic hand grip or handle affixed or integral to proximate end 104 of armature 101 to facilitate manipulation of tool 100 by the user, or comprise telescopic elements to provide for an adjustable armature length or collapsible configuration.

Among various embodiments, armature 101 may suitably couple to tool head 102 by any suitable means. For example, in a preferred embodiment armature 101 may couple to tool head 102 by having distal end 106 threaded and suitably received by receptacle 218. In this manner, armature 101 is releasable from tool head 102, which may facilitate storage, transportation, packaging, etc., but in other embodiments armature 101 may couple by any other manner known to those skilled in the art, such as welds, screws, pins, tabs, glues, etc. And armature 101 may not be releasable at all, but rather may be integrally connected to tool head 102, for example, it may be molded or forged so that tool 100 comprises a single unit.

Figure 2:
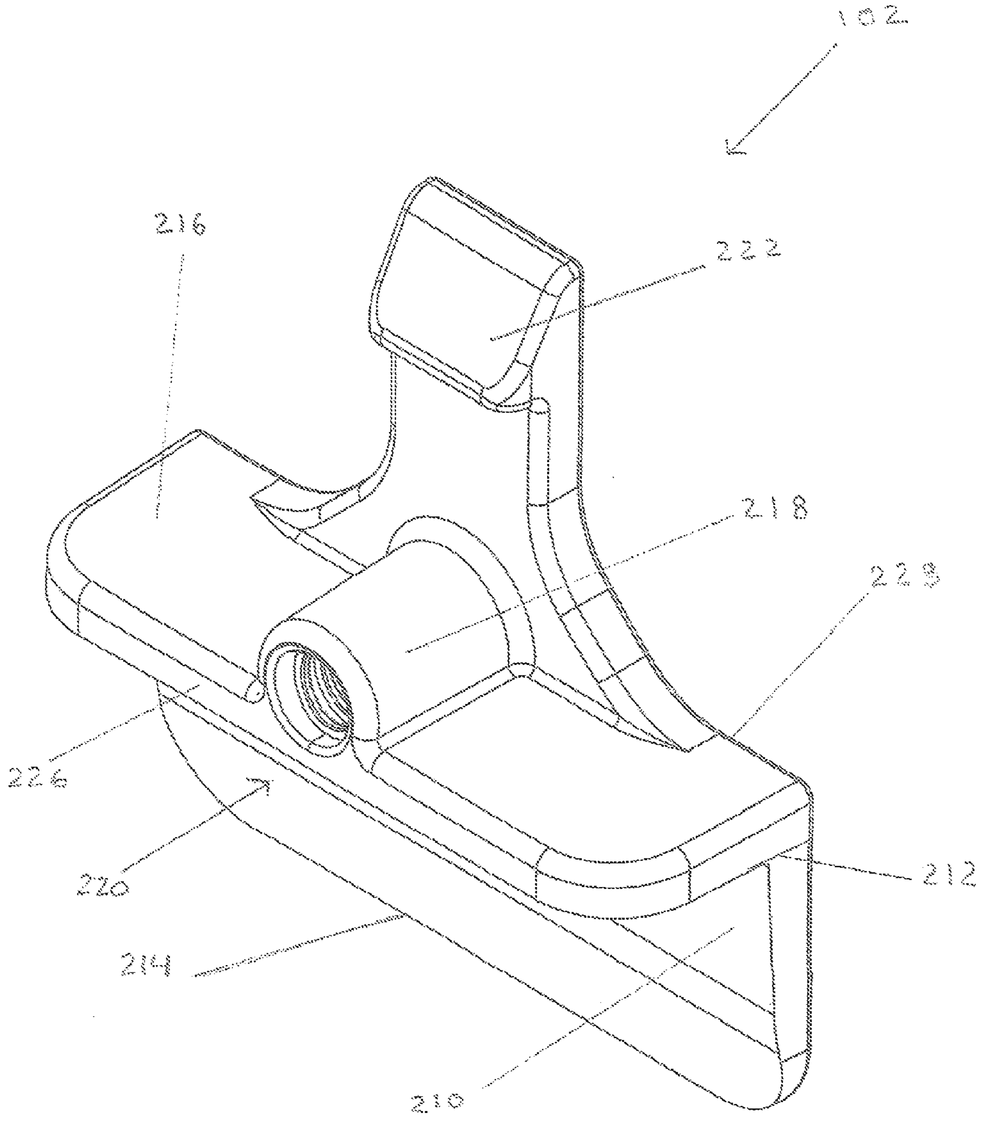
FIG. 2 representatively illustrates a perspective front view of a tuck bed tool head.
Figure 4:
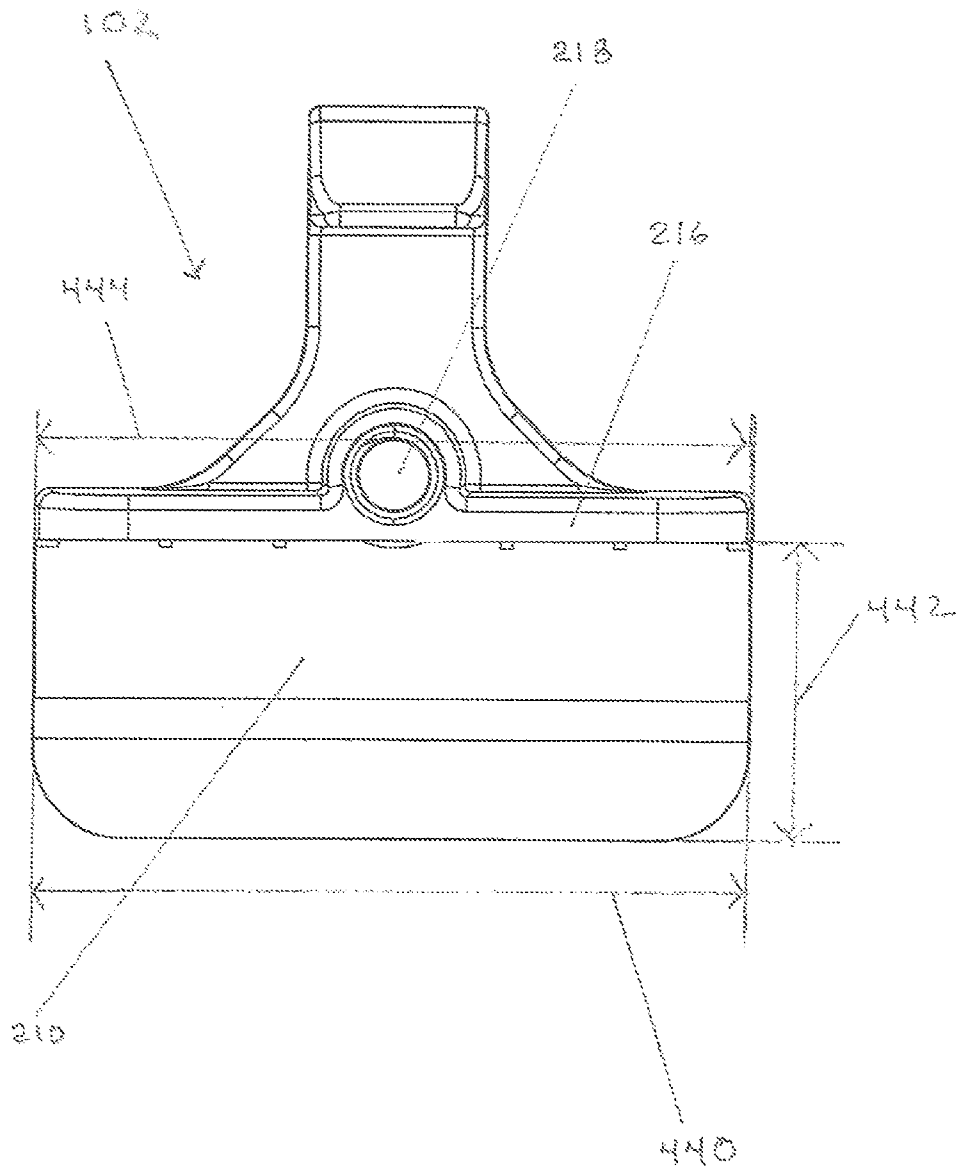
FIG. 4 representatively illustrates a front view of the truck bed tool head.

Turning now to tool head 102, tool head 102 comprises a substantially planar front surface, such as shown by 210 in FIG. 2, but better viewed by FIG. 4. In a preferred embodiment, front surface 210 comprises a relatively flat, planar, plate like configuration comprising a width 440 and a height 442 so as to effectively accommodate manipulating items within a truck bed, such as boxes, which the flat surface configuration beneficially attends. As can be seen, for example in FIG. 1, when tool head 102 is coupled to armature 101 front surface 210 faces towards proximate end 104 of armature 101. Those skilled in the art will appreciate that while tool head 102 may be sized to accommodate items typical of a truck bed, tool head 102 may comprise any of a variety of size widths and heights to accommodate various other uses mentioned previously or as otherwise needed. Among various embodiments, while front surface 210 is depicted and described as comprising a relatively flat, planar, plate like configuration, those skilled in the art will understand that front surface 210 may comprise a myriad of configurations consistent with this disclosure. For example, front surface 210 may comprise any of a variety of regular or irregular geometric configurations apart from the substantially rectangular configuration shown, such as may be oval, square, hexagonal, semi-circular, triangular, etc. Moreover, front surface 210 may not comprise a completely flat configuration, but rather may comprise other geometric qualities configured to facilitate the use of tool 100. For example, front surface 210 may be curved in a convex or concave manner; it may also be bowed, cambered, tapered, etc., and front surface 210 may comprise any combination of such features. Furthermore, leading bottom edge 214, although shown as comprising a straight configuration, may likewise comprise various regular or irregular geometric configurations to accommodate various needs. For example, leading bottom edge 214 may be curved, pronged in a rake-typed fashion, bowed, tapered, etc. For example, and with reference to FIG. 5, leading bottom edge, which is opposite leading top edge 212, comprises a tapered configuration 514, wherein this configuration facilitates wedging tool head 102 between items that may be adjacent to one another.

Among various embodiments and similar to armature 101, front surface 210 may comprise various materials, whether natural or synthetic, such as steel, aluminum, wood, titanium, plastic, and the like various materials. Moreover, front surface 210 may comprises a texture to minimize slipping of front surface 210 from the item when engaged with the item.

Figure 5:
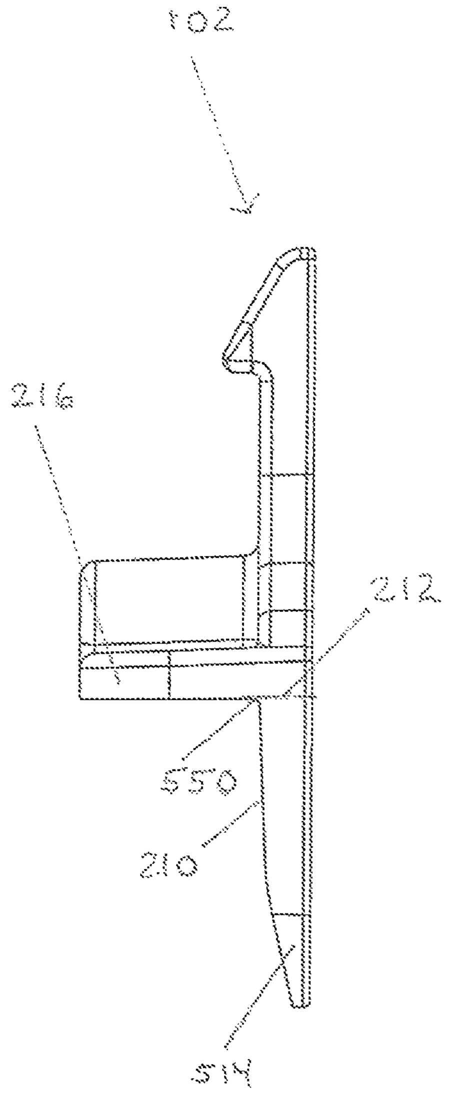
FIG. 5 representatively illustrates a side view of the truck bed tool head.

Continuing with tool head 102 and best seen by FIG. 5, leading top edge 212 comprises planar extension 216, which in a preferred embodiment is substantially normal to front surface 210, i.e., when tool head 102 is coupled to armature 101, planar extension 216 extends towards proximate end 104 of armature 101. Again, front surface 210 and planar extension 216 are configured to conform to a straight edge of a truck bed item for easy manipulation and to facilitate a distributed force along the edge of the item.

It will be appreciated by those skilled in the art that the various dimensional, material, and surface treatments discussed and noted above with respect to front surface 210, as applicable, likewise apply to planar extension 216. It will also be appreciated by those skilled in the art that front surface 210 and planar extension 216 may alternately be understood to comprise a first planar plate, which is similar to front surface 210, and a second planar plate, which is similar to planar extension 216. First planar plate and second planar plate, in this embodiment, may suitably couple together at an intersection 550 to form an elongated, substantially L-shaped configuration, wherein the first planar plate, comprising an upper leading edge similar to leading top edge 212, comprises intersection 550 where the second planar plate joins the first planar plate. Although, in a preferred embodiment, while the two planar plate elements are normal to one another to provide for a substantially L-shaped configuration, other configurations may be employed. For example, the two planar plate elements may couple together to create an angle between them at intersection 550 that is either acute or obtuse, and either plate may comprise alternate geometric configurations as described above. Moreover, the two planar plate elements may be joined by any manner known to those skilled the art, such as, welds, screws, glues, pins, etc., but in a preferred embodiment, the two planar plates are molded together to form a single unit or molded piece.

In a preferred embodiment, and with reference to FIG. 4, second planar plate (planar extension) 216 comprises a width 444 that is similar to width 440 of first planar plate (front surface) 210. Among other embodiments, though, width 444 may be greater or less then width 440.

Continuing with tool head 102 and with return reference to FIG. 2, tool head 102 may comprise a receptacle 218 at a center portion 220 and proximate to leading top edge 212 for receiving and affixing armature 101 to tool head 102. In another embodiment though and with reference to FIG. 4, receptacle 218 may be integrated proximate to a center portion, i.e. width 444, of second planar plate 216. As best seen by FIG. 2, receptacle 218 extends in a normal configuration from and along a front edge 226 of second planar plate 216 towards a rear edge 228 of second planar plate 216.

Although the preferred embodiment provides for receptacle 218 to be positioned at center portion 220, receptacle 218 may be positioned at other points proximate to leading tope edge 212, for example, at a left side portion or a right side portion, or any sides of front surface 210. In a preferred embodiment, receptacle 218 may be threaded to receive a threaded end of armature 101 as described above. Again, in this manner, armature 101 is releasable from tool head 102, which may facilitate storage, transportation, packaging, etc., but in other embodiments receptacle 218 may couple to other elements by any other manner known to those skilled in the art, such as welds, screws, pins, tabs, glues, etc, or may be integrated as part of a single unit.

Continuing with FIG. 2 and in a preferred embodiment, receptacle 218 may be integrated partially within second planar plate 216 and is molded within as part of a single tool head 102 unit, but in other embodiments receptacle 218 may comprise a separate element that may be coupled to second planar plate 216, front surface 210, leading top edge 212, or even hooking mechanism 222 using various coupling methods noted throughout this disclosure.

Among various embodiments and with reference to FIG. 2, tool head 102 may also comprise a hooking element or mechanism 222 positioned generally above and centered with respect to receptacle 218, and is configured to facilitate selectively hooking a truck bed item. In a preferred embodiment, hooking element 222 extends upwards from rear edge 228 of second planar plate 216, substantially parallel to first planar plate 210, and substantially normal to second planar plate 216. However, those skilled in the art will understand that hooking element 222 may be oriented to comprise alternate relational angles.

In a preferred embodiment, hooking element 222 may be integrated partially within second planar plate 216 and is molded within second planar plate as part of a single tool head 102 unit, but in other embodiments hooking element 222 may comprise a separate element that may be coupled to second planar plate 216, front surface 210, leading top edge 212, or receptacle 218, again, using various coupling methods noted throughout this disclosure. And in some embodiments, hooking element 222 may be releasable from tool head 102.

Figure 3:
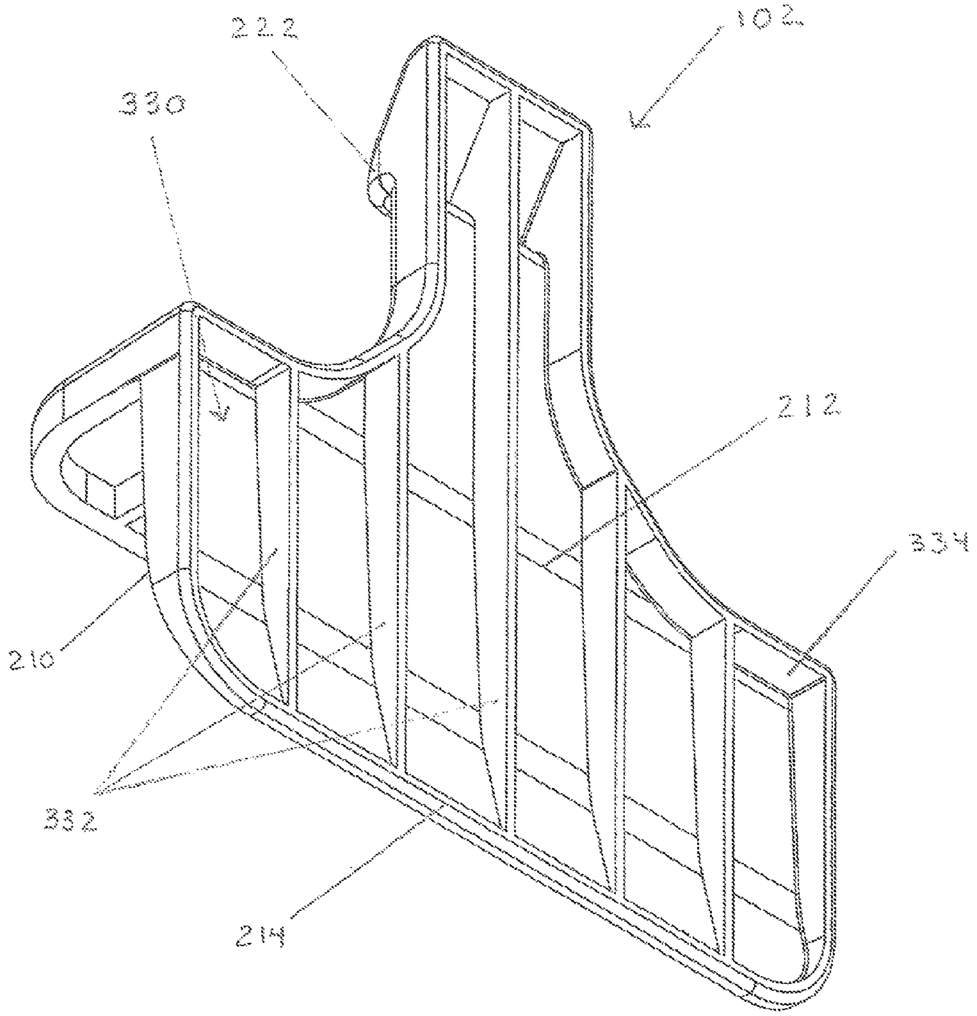
FIG. 3 representatively illustrates a perspective rear view of the truck bed tool head.

Among various embodiments and with reference to FIG. 3, tool head 102 may comprise integrated reinforcement rib members 332 within a rear cavity 330, wherein rear cavity 330 may be formed by a head perimeter 334 extending rearward around edges of front surface 210 and hooking element 222. As can be seen, reinforcement rib members 332 are integrated on a backside of first planar plate 210 and a backside (underside) of second planar plate 216. Reinforcement members 332 operate to provide additional stability and strength for tool head 102. As can be further seen, reinforcement members 332 are positioned and run substantially parallel to one another along the backside and/or underside of the planar plate elements, but those skilled in the art will understand that any other type of reinforcement elements and configurations may be used. For example, reinforcement members 332 may run in different directions, or they may comprise a honeycomb type configuration, etc.

Reinforcement members 332, in a preferred embodiment, are integral and molded as part of a single tool head 102 unit, but in other embodiments they may comprise separate elements that may be coupled to the planar plate elements using the various coupling methods noted throughout this disclosure.

In accordance with various embodiments of a truck bed tool, a method for manufacturing a truck bed tool may comprise; molding a first planar plate and a second planar plate together to comprise an elongated, substantially L-shaped configuration; molding a receptacle proximate to a center portion of the second planar plate and extending in a normal configuration from and along a front edge of the second planar plate towards a rear edge of the second planar plate; molding a hooking element to extend from the rear edge of the second planar plate, substantially parallel to the first planar plate and normal to the second planar plate; and molding reinforcement rib members integrated on a backside of the first planar plate and a backside of the second planar plate.

The method may further comprise, wherein molding the first planar plate comprises molding the first planar plate to be tapered along a lower leading edge opposite an upper leading edge, wherein the upper leading edge comprises an intersection where the second planar plate joins the first planar plate. The method may also comprise, wherein molding the receptacle comprises molding the receptacle to be threaded and/or, wherein molding the receptacle may further comprise molding the receptacle to be integrated partially within the second planar plate. Other manufacturing methods may comprise, wherein forming the at least one of the first planar plate and the second planar plate comprises forming at least one of the first planar plate and the second planar plate to be textured. Manufacturing methods may also comprise affixing the extension tool to the receptacle; and/or affixing an ergonomic grip handle to the extension tool.

Among the methods described herein, and although a particular order of actions is disclosed, these actions may be performed in other temporal sequences. For example, the actions may be performed sequentially, concurrently, or simultaneously. Other methods and variations of exemplary methods are also contemplated by this disclosure, for example, a method of packaging the embodiments, a method of marketing the embodiments, a method for distributing the embodiments, and/or a method of selling the embodiments may be claimed. Furthermore, any method elements recited may be similar to the various elements shown and described with respect to the physical embodiment elements discussed herein and shown throughout FIGS. 1-5.

The truck bed tool and methods described may be implemented in a variety of embodiments, and the foregoing discussion of embodiments does not necessarily represent a complete description of all possible embodiments. For example, other embodiments may comprise some, all, or a combination of the embodiments disclosed. For example, alternate embodiments may comprise a combination of some or all of the embodiments depicted in FIGS. 1-5.

In the foregoing specification, the truck bed tool has been described with reference to specific truck bed tool embodiments. Various modifications and changes may be made, however, without departing from the scope of the truck bed tool as set forth in the claims. The specification and Figs. are illustrative, rather than restrictive, and any modifications are intended to be included within the scope of the truck bed tool. Accordingly, the scope of the truck bed tool should be determined by the claims and their legal equivalents rather than by strictly the embodiments described.

For example, the steps recited in any method claims may be executed in any order and are not limited to the specific order presented in the claims. Additionally, the components and/or elements recited in any article, device, tool, system and the like claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features, or components of any or all the claims.

As used herein, the terms "comprise", "comprises", "comprising", "having", "including", "includes", "is" or any variation thereof, are intended to reference a non-exclusive inclusion, such that a process, method, article, composition, device, system, tool or apparatus that comprises a list of elements does not include only those elements recited, but may also include other elements not expressly listed or inherent to such process, method, article, composition, device, system, tool or apparatus. Other combinations and/or modifications of the above-described structures, arrangements, applications, proportions, elements, materials or components used in the practice of the truck bed tool, in addition to those not specifically recited, may be varied or otherwise particularly adapted to specific environments, manufacturing specifications, packaging elements, marketing efforts, design parameters or other operating requirements without departing from the general principles of the same.

I claim:

1. A tool to manipulate items within a truck bed comprises:
- an armature comprising a length to reach from a tailgate end of the truck bed to a cab end of the truck bed, and
- a manipulating head coupled to a distal end of the armature, wherein the head comprises;
  - an elongated, substantially planar front surface facing towards a proximate end of the armature, and wherein the front surface comprises a leading top edge and leading bottom edge,
  - a receptacle at a center portion and proximate to the leading top edge for receiving and affixing the armature to the head,
  - a hooking mechanism above the receptacle configured to selectively hook a truck bed item,
  - integrated reinforcement rib members within a rear cavity of the head, wherein the rear cavity is formed by a head perimeter extending rearward around edges of the front surface and the hooking mechanism;
    - the leading top edge comprises a planar extension substantially normal to the front surface and extends towards the proximate end of the armature, wherein the front surface and planar extension are configured to conform to a straight edge of the truck bed item for easy manipulation and facilitate a distributed force along the edge of the item.

2. The tool of claim 1, wherein the planar front surface comprises a texture to minimize slipping of the planar front surface from the item.

3. The tool of claim 1, wherein the armature is releasable from the head.

4. The tool of claim 3, wherein the hooking mechanism is releasable from the head.

5. The tool of claim 1, wherein the head comprises a single molded piece.

6. A truck bed manipulation tool comprising:
- a first planar plate and a second planar plate suitably coupled together to comprise an elongated, substantially L-shaped configuration;
- a receptacle integrated proximate to a center portion of the second planar plate and extending in a normal configuration from and along a front edge of the second planar plate towards a rear edge of the second planar plate, the receptacle configured to receive an end of an extension tool;
- a hooking element extending from the rear edge of the second planar plate, substantially parallel to the first planar plate and normal to the second planar plate; and reinforcement rib members integrated on a backside of the first planar plate and a backside of the second planar plate.

7. The tool of claim 6, wherein the first planar plate is tapered along a lower leading edge opposite an upper leading edge, wherein the upper leading edge comprises an intersection where the second planar plate joins the first planar plate.

8. The tool of claim 7, wherein the receptacle is threaded.

9. The tool of claim 8, wherein the receptacle is integrated partially within the second planar plate.

10. The tool of claim 9, wherein at least one of the first planar plate and the second planar plate are textured.

11. The tool of claim 10 further comprising the extension tool comprising at least one end configured to be received by the receptacle.

12. A method for manufacturing a truck bed manipulation tool comprising:

molding a first planar plate and a second planar plate together to comprise an elongated, substantially L-shaped configuration;

molding a receptacle proximate to a center portion of the second planar plate and extending in a normal configuration from and along a front edge of the second planar plate towards a rear edge of the second planar plate, the receptacle configured to receive an end of an extension tool;

molding a hooking element to extend from the rear edge of the second planar plate, substantially parallel to the first planar plate and normal to the second planar plate; and molding reinforcement rib members integrated on a backside of the first planar plate and a backside of the second planar plate.

13. The method of claim 12, wherein molding the first planar plate comprises molding the first planar plate to be tapered along a lower leading edge opposite an upper leading edge, wherein the upper leading edge comprises an intersection where the second planar plate joins the first planar plate.

14. The method of claim 13, wherein molding the receptacle comprises molding the receptacle to be threaded.

15. The method of claim 14, wherein molding the receptacle further comprises molding the receptacle to be integrated partially within the second planar plate.

16. The method of claim 15, wherein forming the at least one of the first planar plate and the second planar plate comprises forming at least one of the first planar plate and the second planar plate to be textured.

17. The method of claim 16, further comprising affixing the extension tool to the receptacle.

* * * * *